United States Patent
Gir et al.

(10) Patent No.: US 10,682,815 B2
(45) Date of Patent: Jun. 16, 2020

(54) STEREOLITHOGRAPHY 3D PRINTER AND METHODS OF ADJUSTING TEMPERATURE OF PRINTING MATERIALS THEREOF

(71) Applicants: XYZPRINTING, INC., New Taipei (TW); KINPO ELECTRONICS, INC., New Taipei (TW)

(72) Inventors: Chung-Yen Gir, New Taipei (TW); Hung-Wei Huang, New Taipei (TW); Tsung-Hua Kuo, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 35 days.

(21) Appl. No.: 16/257,235

(22) Filed: Jan. 25, 2019

(65) Prior Publication Data

US 2019/0389132 A1 Dec. 26, 2019

(30) Foreign Application Priority Data

Jun. 22, 2018 (CN) .......................... 2018 1 0652615

(51) Int. Cl.
*B29C 64/20* (2017.01)
*B29C 64/386* (2017.01)
(Continued)

(52) U.S. Cl.
CPC .......... *B29C 64/386* (2017.08); *B29C 64/227* (2017.08); *B29C 64/264* (2017.08);
(Continued)

(58) Field of Classification Search
None
See application file for complete search history.

(56) References Cited

U.S. PATENT DOCUMENTS

2016/0096331 A1* 4/2016 Linnell ................. B29C 64/124
264/494
2016/0129631 A1* 5/2016 Chen ..................... B29C 64/245
425/150

(Continued)

FOREIGN PATENT DOCUMENTS

DE 102015015328 A1 6/2017
EP 3260276 A1 12/2017
(Continued)

OTHER PUBLICATIONS

Search Report dated Sep. 19, 2019 of the corresponding European patent application.

(Continued)

*Primary Examiner* — Bernard G Lindsay
(74) *Attorney, Agent, or Firm* — Chun-Ming Shih; HDLS IPR Services

(57) ABSTRACT

A stereolithography 3D (three-dimensional) printer and a method of adjusting temperature of printing materials thereof are provided. The stereolithography 3D printer has a material tank for accommodating print materials, a light module, a temperature-adjusting module, a temperature-sensing module, and a curing platform. The stereolithography 3D printer executes a procedure of controlling temperature for adjusting a temperature of the print material if a sensed temperature doesn't reach a default value, and executes a procedure of 3D printing for manufacturing a 3D physical model by using the print material whose temperature had been adjusted. The printing quality of the 3D physical models can be effectively improved via controlling the temperature of the print materials.

13 Claims, 6 Drawing Sheets

(51) Int. Cl.
  *B29C 64/264* (2017.01)
  *B29C 64/307* (2017.01)
  *B29C 64/295* (2017.01)
  *B29C 64/227* (2017.01)
  *G06F 3/12* (2006.01)
  *B33Y 10/00* (2015.01)

(52) U.S. Cl.
  CPC .......... *B29C 64/295* (2017.08); *B29C 64/307* (2017.08); *G06F 3/1237* (2013.01); *B33Y 10/00* (2014.12)

(56) References Cited

U.S. PATENT DOCUMENTS

| | | |
|---|---|---|
| 2017/0050389 A1 | 2/2017 | Lee |
| 2017/0297111 A1* | 10/2017 | Myerberg ............... B29C 64/10 |
| 2018/0065302 A1* | 3/2018 | Arai ...................... B29C 64/129 |
| 2018/0215092 A1* | 8/2018 | Dudley .................. B29C 64/40 |
| 2018/0304361 A1* | 10/2018 | Gibson .................. B22F 3/008 |
| 2020/0086554 A1* | 3/2020 | Hou ....................... B33Y 40/10 |

FOREIGN PATENT DOCUMENTS

| | | |
|---|---|---|
| JP | H02178022 A | 7/1990 |
| JP | 2018039188 A | 3/2018 |

OTHER PUBLICATIONS

Office Action dated Jan. 21, 2020 of the corresponding Japan patent application.

\* cited by examiner

STEREOLITHOGRAPHY 3D PRINTER AND METHODS OF ADJUSTING TEMPERATURE OF PRINTING MATERIALS THEREOF

BACKGROUND OF THE INVENTION

Field of the Invention

The technical field relates to 3D printing and more particularly related to a stereolithography 3D printer and a method of adjusting temperature of printing materials thereof.

Description of Related Art

A stereolithography 3D printer has an ability of manufacturing a 3D physical model by irradiating the liquid stereolithography materials (such as UV resin) for curing the irradiated stereolithography materials.

Besides, the minimum Illuminance of light for completely curing the same stereolithography materials changes with a temperature of the stereolithography materials, and the temperature of the stereolithography materials changes with an environmental temperature. Furthermore, a power (the provided light energy) outputted by a light module of the stereolithography 3D printer usually can't be adjusted, so the stereolithography 3D printer of the related art can't automatically change the outputted power of the light module with the temperature of the stereolithography materials.

As a result, in the stereolithography 3D printing of the related art, a problem of the stereolithography materials incomplete curing or overcuring caused by the light energy unchanging with the temperature of the stereolithography materials when the environmental temperature changes (namely, the temperature of the stereolithography materials changes) will reduce a print quality of the 3D physical model.

SUMMARY OF THE INVENTION

The present disclosed example is directed to a stereolithography 3D printer and a method of adjusting temperature of printing materials thereof having an ability of making the print materials reach the ideal working temperature.

One of the exemplary embodiments, a stereolithography 3D printer comprises: a material tank configured to store print materials, a light module configured to transmit beams to the material tank, a temperature-adjusting module configured for temperature-adjusting, a temperature-sensing module configured to sense a sensed temperature, a curing platform configured to carry a 3D physical model, a memory module configured to store print data and a default value, and a control module electrically connected to the light module, the temperature-adjusting module, the temperature-sensing module and the memory module. The control module executes a procedure of controlling temperature to control the temperature-adjusting module to adjust a temperature of the print materials when the sensed temperature doesn't reach the default value, and executes a procedure of 3D printing according to the print data to control the light module to irradiate the print materials whose temperature had been adjusted for manufacturing the 3D physical model.

One of the exemplary embodiments, a method of adjusting temperature of printing materials applied to a stereolithography 3D printer is provided, the stereolithography 3D printer comprises a temperature-adjusting module, a temperature-sensing module, a light module, a curing platform and a material tank. The method of adjusting temperature of printing materials comprises following steps: retrieving a sensed temperature via the temperature-sensing module; executing a procedure of controlling temperature to control the temperature-adjusting module to adjust a temperature of the print materials when the sensed temperature doesn't reach a default value; and executing a procedure of 3D printing according to the print data to control the light module to irradiate the print materials whose temperature had been adjusted for manufacturing a 3D physical model.

The present disclosed example can effectively improve a printing quality of the 3D physical models via controlling the temperature of the print materials.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
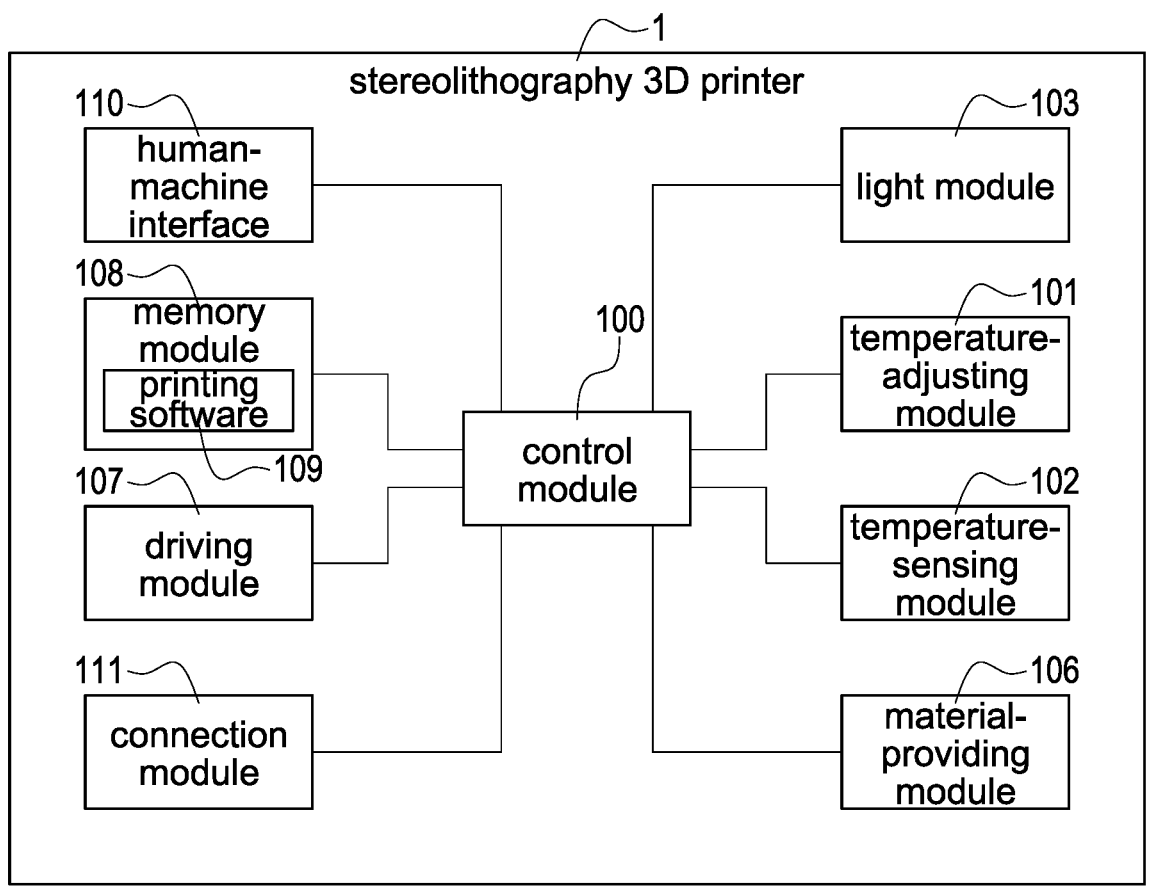
FIG. 1 is an architecture diagram of a 3D printing system according to one embodiment of the present disclosed example.
Figure 2:
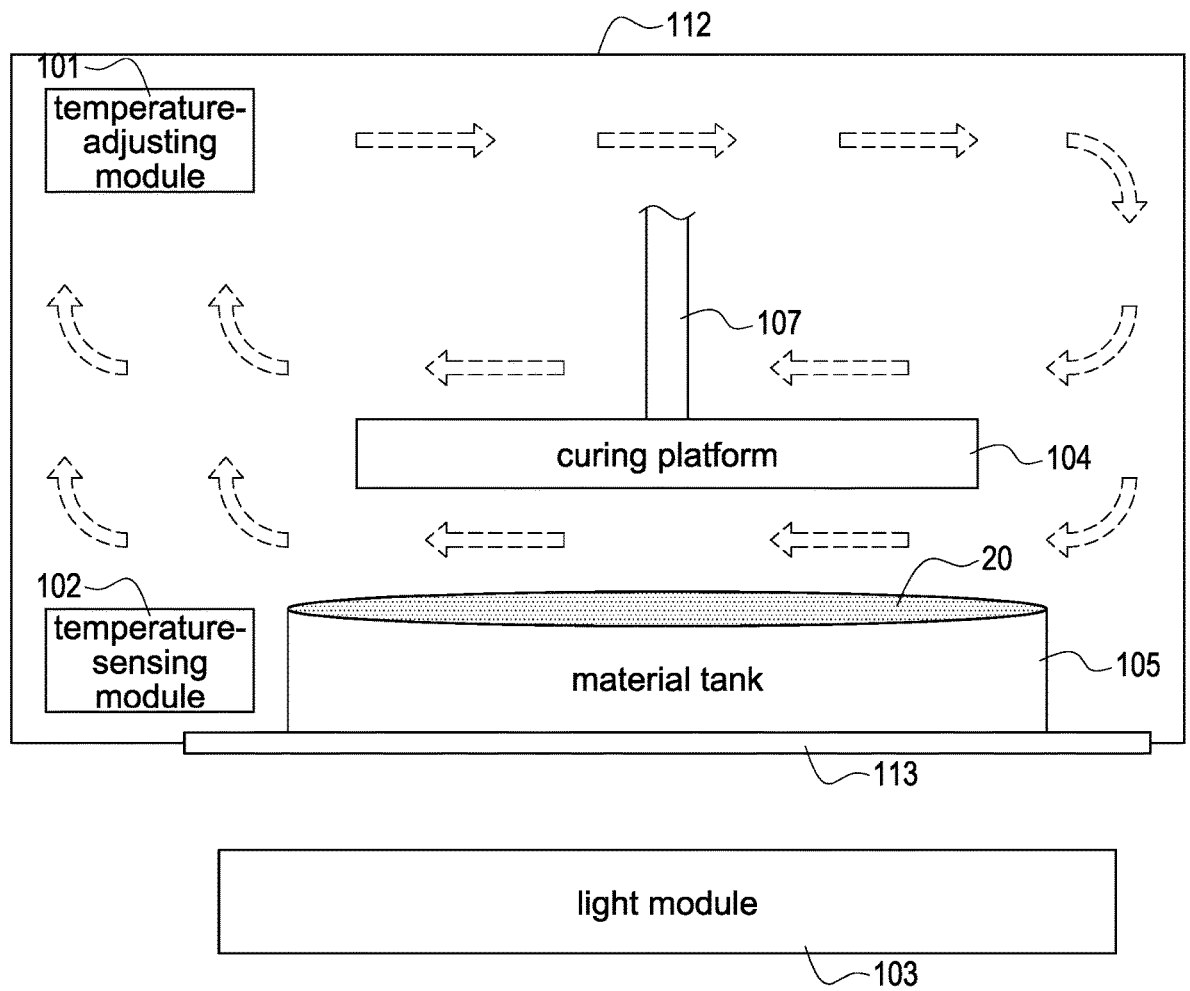
FIG. 2 is a schematic view of controlling temperature by a 3D printer according to one embodiment of the present disclosed example.
Figure 3:
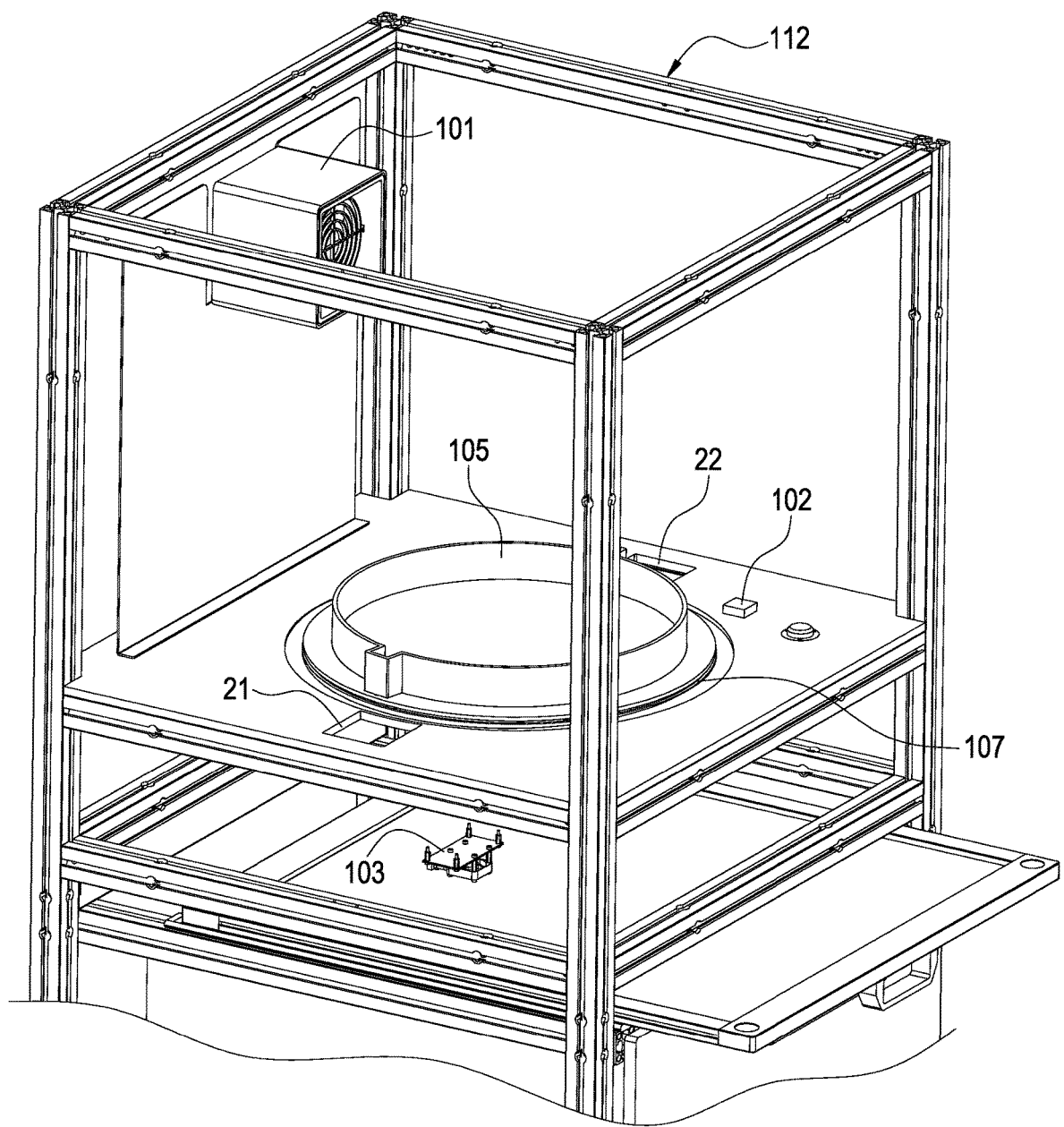
FIG. 3 is a schematic view of appearance of a stereolithography 3D printer according to one embodiment of the present disclosed example.

Please refer to FIG. 1 to FIG. 3 simultaneously, FIG. 1 is an architecture diagram of a 3D printing system according to one embodiment of the present disclosed example, FIG. 2 is a schematic view of controlling temperature by a 3D printer according to one embodiment of the present disclosed example, and FIG. 3 is a schematic view of appearance of a stereolithography 3D printer according to one embodiment of the present disclosed example.

As shown in figures, a stereolithography 3D printer 1 having an ability to adjust the temperature of the print materials 20 automatically is disclosed in the present disclosed example. The present disclosed example can prevent the print materials 20 from incomplete curing or overcuring via making the print materials 20 keep in the ideal working temperature, and improve the print quality of the manufactured 3D physical models. Following embodiments take the stereolithography 3D printer 1 being a bottom-up light source stereolithography 3D printer for explain, but this specific example is not intended to limit the scope of the present disclosed example. The stereolithography 3D printer 1 can be a downlight stereolithography 3D printer in one embodiment.

More specifically, the stereolithography 3D printer 1 mainly comprises a control module 100, a temperature-adjusting module 101, a temperature-sensing module 102, a light module 103, a curing platform 104, a material tank 105 and a driving module 107.

The control module 100 is electrically connected to the temperature-adjusting module 101, the temperature-sensing module 102, the light module 103 and the driving module 107, and has an ability to control the stereolithography 3D printer 1 to execute the stereolithography 3D printing.

The light module 103 is configured to transmits the beams to one or more designated position(s) of the curing platform 104. One of the exemplary embodiments, the light module 103 comprises a line light source or a surface light source, and comprises a plurality of light spots. The control module 100 may control the light spots of the light module 103 to light up simultaneously, go out simultaneously, or light up partially, so as to irradiate a plurality of print positions simultaneously. One of the exemplary embodiments, the light module 103 comprises a single light source (such as a single point laser light emitter). The control module 100 may control a galvanometer module (not shown in figures) to fast change the angles of multiple prisms of the galvanometer module for changing the print positions currently irradiated by the light beam in a very short time (such as 0.01 seconds), and make the light module 103 have an ability of simulating the irradiation effect of line light source or surface light source.

The curing platform 104 is configured to carry a 3D physical model during printing. The material tank 105 is configured to store the print materials 20. Above print materials 20 may be liquid materials, and become cured after irradiation. The driving module 107 is connected to the light module 103, the curing platform 104 and/or material tank 105. The driving module 107 may move above connected module.

For example, when the driving module 107 is connected to the light module 103, the driving module 107 may be controlled by the control module 100 to move the light module 103 for transmitting the beams to one or more designated position(s) of the curing platform 104. When the driving module 107 is connected to the curing platform 104, the driving module 107 may be controlled by the control module 100 to move the curing platform 104 along a preset axis (such as the vertical Z-axis) for printing layer by layer (as shown in FIG. 2).

In one example, when the driving module 107 is connected to the material tank 105, the driving module 107 may be controlled by the control module 100 to move (such as rotating or shaking) the material tank 105 for mixing the print materials 20 evenly (as shown in FIG. 3).

In one example, the driving module 107 simultaneously move (such as rotating or shaking) the material tank 105 for mixing the print materials 20 evenly during the temperature-adjusting module 101 having operated for adjusting the temperature of the print materials 20 (but the light module 103 doesn't transmit any beam for stereolithography 3D printing). The present disclosed example can effectively improve an effectiveness of adjusting the temperature of the print materials 20 and effectively reduce the temperature difference between the different positions of the print materials 20.

The temperature-adjusting module 101 is configured to adjust the temperature of the print materials 20 (such as UV curable resin or the other types of stereolithography materials). The temperature-adjusting module 101 may comprise a heater (such as air heater or infrared light), a cooler (such as thermoelectric cooling apparatus or compressor cooling apparatus) or a combination of the heater and the cooler, but this specific example is not intended to limit the scope of the present disclosed example. One of the exemplary embodiments, the temperature-adjusting module 101 is configured to adjust the temperature of the print materials 20 indirectly (namely, the temperature-adjusting module 101 doesn't contact the print materials 20 directly). The temperature-adjusting module 101 is configured to heat/cool the air in the print space (such as the internal space of a case 112 shown in FIG. 2) for adjusting the temperature of the print materials 20 indirectly. Adjusting the temperature of the print materials 20 directly may the print materials 20 having the obvious temperature difference at the different positions (take heating for example, the temperature at the positions around the heating point is hottest, and the farther away from the heating point, the lower the temperature). Compare to above direct adjustment scheme, the scheme of adjusting the temperature of the print materials 20 indirectly can make the temperatures at the different positions of the print material 20 be closer. Especially, when an area of the material tank 105 is bigger (such as a diameter of the round material tank 105 is slightly greater than 30 centimeters), the scheme of adjusting the temperature of the print materials 20 indirectly can effectively make the temperatures at the different positions of the print material 20 be closer obviously.

The temperature-sensing module 102 (such as an electronic thermometer) is configured to sense the temperature of the print materials 20 as the sensed temperature. One of the exemplary embodiments, the temperature-sensing module 102 is arranged in the material tank 105, so as to sense the temperature of the material tank 20 directly. One of the exemplary embodiments, the temperature-sensing module 102 is arranged at a position near the material tank 105 (such as the positions of the temperature-sensing module 102 shown in FIG. 2 and FIG. 3), so as to sense the temperature of the air around the material tank 105 as the sensed temperature. The temperature-sensing module 102 of above indirectly sensing scheme of sensing the temperature of the air around the material tank 105 as the sensed temperature may not have the waterproof function or the anti-corrosion function because the temperature-sensing module 102 doesn't contact with the print material 20, so as to reduce its cost and volume.

One of the exemplary embodiments, the stereolithography 3D printer 1 further comprises a material-providing module 106 electrically connected to the control module 100. The material-providing module 106 is connected to the material tank 105 and has an ability to inject the print materials 20 into the material tank 105. More specifically, the 3D physical model is stacked by multiple layers of the slice physical models, the amount of the print materials 20 being injected into the material tank 105 by the material-providing module 106 each time is just enough to print one layer of the slice physical model (such as the depth of the print materials 20 in the material tank 105 is the default layer height). After completion of printing one layer of the slice physical model, the print materials 20 for printing the next layer of the slice physical model is injected into the material tank 105 by the material-providing module 106, and so on. Thus, the present disclosed example can effectively prevent the print materials 20 from deterioration, such as curing caused by the unexpected light. Moreover, the present disclosed example can further improve the efficiency of adjustment the temperature because of a volume of the printing materials 20 in the material tank 105 is reduced.

One of the exemplary embodiments, the stereolithography 3D printer 1 further comprises a memory module 108. The memory module 108 is configured to store data, such as printing software 109, the printing software 109 may be a firmware or operating system of the stereolithography 3D printer 1, but this specific example is not intended to limit the scope of the present disclosed example. Furthermore, the memory module 108 comprises a non-transient computer-readable recording media. A plurality of computer-readable codes is recorded in the printing software 109. After the control module 100 executes the printing software 109, the control module 100 may control each of the modules of the stereolithography 3D printer 1 to perform each temperature-controlling step and each printing step described later.

One of the exemplary embodiments, the stereolithography 3D printer 1 further comprises a connection module 111, such as USB module, Wi-Fi module or the other wired/wireless connection module. The connection module 111 is configured to connect an external apparatus (such as a computer apparatus of the user) for receiving data (such as the print data described later).

One of the exemplary embodiments, the stereolithography 3D printer 1 further comprises a human-machine interface 10 (such as buttons, a monitor, indicators, a buzzer, or any combination of above elements). The human-machine interface 110 is configured to receive a user operation and output the print-related information.

One of the exemplary embodiments, as shown in FIG. 2, the stereolithography 3D printer 1 is a bottom-up light source stereolithography 3D printer, and comprises a case 112. The case 112 at least covers the temperature-adjusting module 101, the temperature-sensing module 102, the curing platform 104, and the material tank 105 for protection.

One of the exemplary embodiments, as shown in FIG. 2, at least one light-transmissive board 113 is arranged on the bottom of the material tank 105 and/or the case 112, so as to make the beams transmitted by the light module 103 penetrate the light-transmissive board 113 and irradiate the print materials 20 in the material tank 105 for inducing the curing action.

One of the exemplary embodiments, as shown in FIG. 2, the temperature-adjusting module 101 comprises a fan (such as air heater or air cooler) or the other forced convection apparatuses. Above forced convection apparatuses have an ability to form a forced convection. One of the exemplary embodiments, an arrangement position of the forced convection apparatus is higher than an arrangement position of the material tank 105 (as shown in FIG. 2 and FIG. 3). The temperature-adjusting module 101 may heat/cool the air inside the case 112 for making the flowing air form a closed circulation of the heated air inside the case 112.

One of the exemplary embodiments, the arrangement position of the temperature-adjusting module 101 is higher than a waiting position of the curing platform 104 (as shown in FIG. 2) for forming a path of closed circulation of the flowing air inside the case 112 during operating.

Furthermore, when the curing platform 104 is located at the waiting position, the curing platform 104 is located above the material tank 105 and a distance between the curing platform 104 and the material tank 105 be a default distance (such as the distance between a worktop of the curing platform 104 and the liquid level of the print materials 20 in the material tank 105 is 10 centimeters). Thus, there is an appropriate air convection space between the material tank 105 and the curing platform 104, so as to improve the efficiency of closed circulation and temperature-adjusting. The present disclosed example can greatly improve the efficiency of temperature-adjusting via closed circulation.

Furthermore, as shown in FIG. 3, in general, the case 112 is not completely sealed because the production cost of a completely sealed case 112 is very high, such as some mounting holes 21, 22 are on the floor of the case 112. Thus, the heated/cooled air is easy to vent from above-mentioned holes and the efficiency of temperature-adjusting will be reduced if the temperature-adjusting module 101 is arranged at the lower position (such as the floor) or the temperature-adjusting module 101 only comprises the diffusion heating/cooling apparatus without any forced convection apparatus (namely, the temperature-adjusting module 101 doesn't comprise any fan, such that the temperature-adjusting module 101 adjusts the temperature of the air inside the case 112 only by the diffusion action). Thus, the present disclosed example can drastically reduce the amount of the heated/cooled air vented from the holes and improve the efficiency temperature-adjusting via arranging the temperature-adjusting module 101 at a higher position and using the fan for increasing a velocity of the flowing air.

Figure 4:
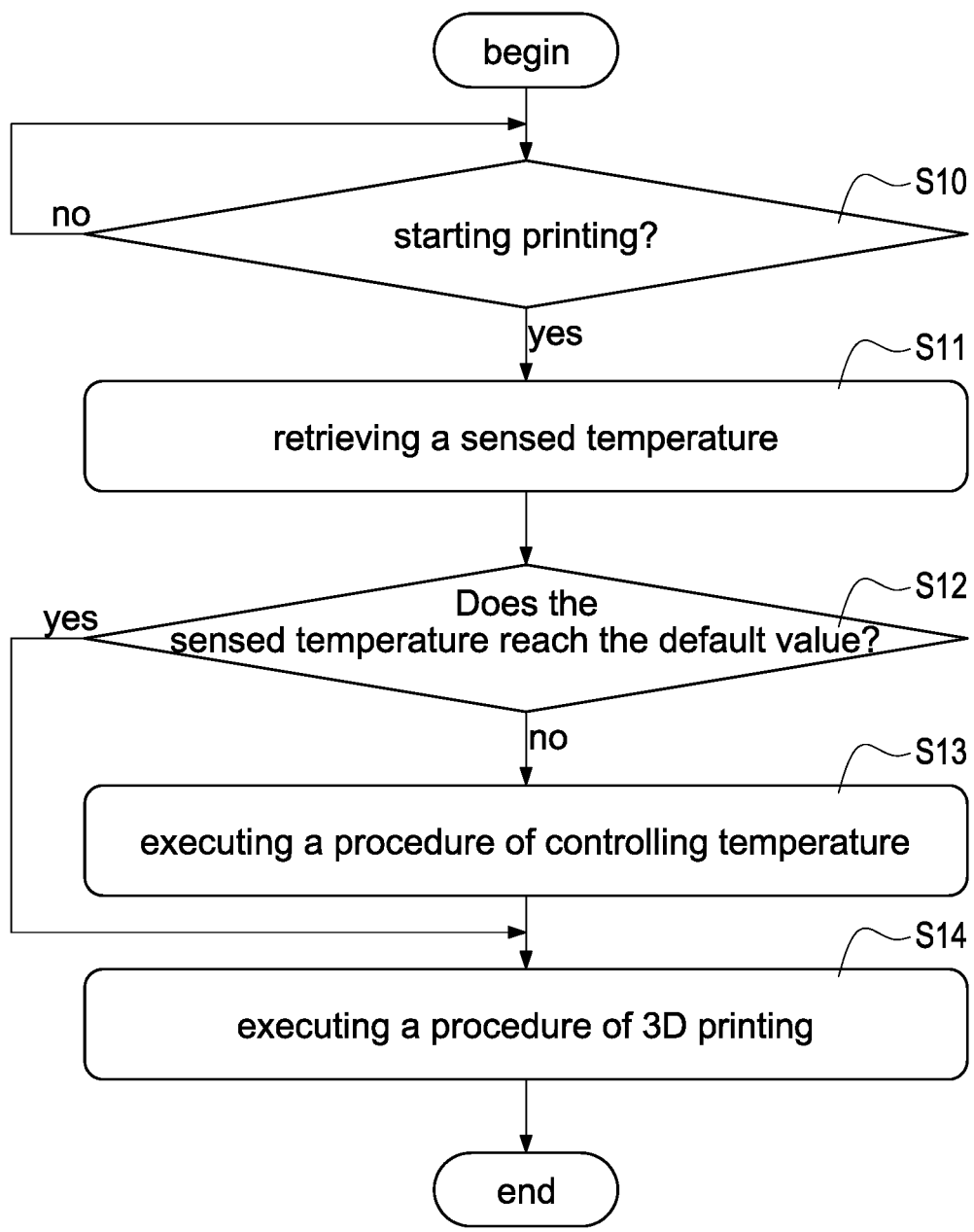
FIG. 4 is a flowchart of a method of adjusting temperature of printing materials according to the first embodiment of the present disclosed example.

Please refer to FIG. 4 simultaneously, which is a flowchart of a method of adjusting temperature of printing materials according to the first embodiment of the present disclosed example. The method of adjusting temperature of printing materials of each embodiment of the present disclosed example may be implemented by the stereolithography 3D printer 1 shown in FIG. 1 to FIG. 3. The method of adjusting temperature of printing materials of this embodiment comprises following steps.

Step S10: the control module 100 determines whether starting to execute the 3D printing, such as starting to execute the 3D printing when receipt of a print instruction or the print data via the connection module 111 or receiving the print operation via the human-machine interface 110.

If the control module 10 determines that starting to execute the 3D printing, the control module 100 performs the step S11. Otherwise, the control module 100 performs the step S10 again for continuously detecting whether the 3D printing should be started.

One of the exemplary embodiments, the control module 100 control the material-providing module 106 to inject the print materials 20 into the material tank 105 after starting to execute the 3D printing.

Step S11: the control module 100 retrieves the sensed temperature of the print space via the temperature-sensing module 102.

Step S12: the control module 100 loads a default value (such as 25 degrees Celsius) from the memory module 108, and determines whether the retrieved sensed temperature reaches the default value. Each of the different default values respectively corresponds to at least one type of the print materials 20, and the default value may change with the type of the print materials 20. The default value may be configured as the ideal working temperature of the print materials 20.

For example, if the temperature-adjusting module 101 is heater, the control module 100 is configured to determines whether the sensed temperature is lower than the default value. If the temperature-adjusting module 101 is cooler, the control module 100 is configured to determines whether the sensed temperature is greater than the default value.

If the control module 100 determines that the sensed temperature doesn't reach the default value, the control module 100 performs the step S13. Otherwise, the control module 100 performs the step S14.

Step S13: the control module 100 executes the procedure of controlling temperature. More specifically, the control module 100 may start the temperature-adjusting module 101 up to adjust the temperature of the print materials 20 in the material tank 105, so as to make the temperature of print materials 20 trend toward the default value.

Step S14: the control module 100 executes the procedure of 3D printing. More specifically, the control module 100 retrieves the print data, and controls the light module 103 to irradiate the print materials 20 whose temperature had been adjusted for curing the print materials 20 whose temperature had been adjusted to manufacturing the 3D physical model.

Above print data may be stored in the memory module 108, or be received by the connection module 111 from the external computer apparatus. One of the exemplary embodiments, the user may operate the computer apparatus to load object data corresponding to a set of virtual 3D object, and execute a slicing process on the 3D object data for generating above print data. Then, the user may operate the computer apparatus to transmit the print data to the stereolithography 3D printer 1 for 3D printing. One of the exemplary embodiments, above-mentioned print data comprises a plurality of 2D images, each 2D image corresponds to one layer of the virtual slice object, above-mentioned slice process is configured to divide the virtual 3D object into multiple layers of the virtual slice objects.

The present disclosed example can effectively improve a printing quality of the 3D physical models via controlling the temperature of the print materials.

Figure 5:
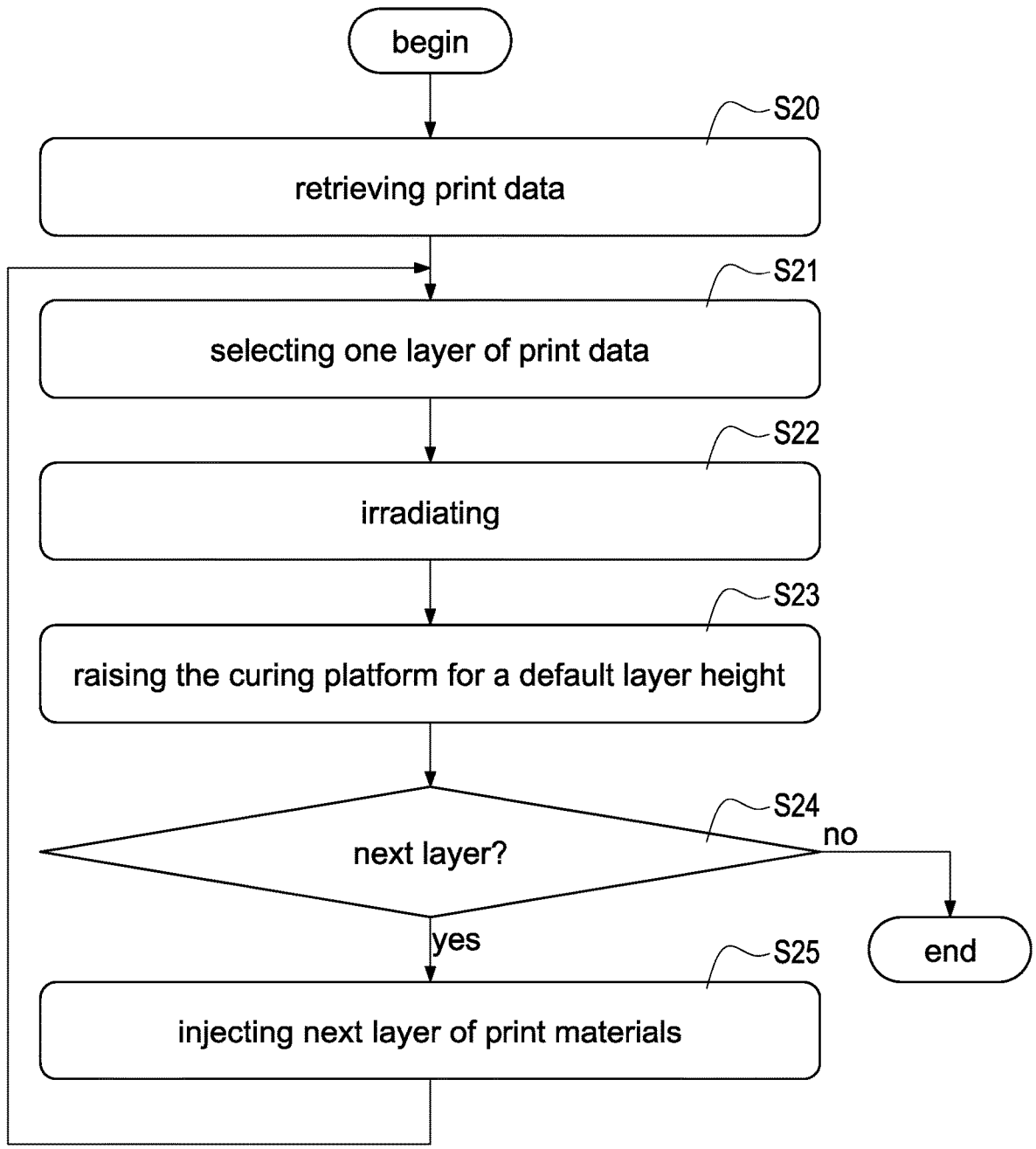
FIG. 5 is a flowchart of a procedure of 3D printing according to the second embodiment of the present disclosed example.

Please refer to FIG. 4 and FIG. 5 simultaneously, FIG. 5 is a flowchart of a procedure of 3D printing according to the second embodiment of the present disclosed example. In this embodiment, the material-providing module 106 injects the amount of the print materials 20 being injected into the material tank 105 by the material-providing module 106 each time is enough to print one layer of the slice physical model.

Compare to the method of adjusting temperature of printing materials of the embodiment shown in FIG. 4, the procedure of 3D printing (the step S14) of this embodiment comprises following steps.

Step S20: the control module 100 loads the multiple layers of the print data from the memory module 108. More specifically, each layer of above-mentioned print data (such as a 2D image) is used to describe a shape of one layer of virtual slice object. After the light module 103 irradiates the print materials 20 according to each layer of the print data, each layer of the slice physical model whose appearance corresponding to the virtual slice object will be manufactured.

One of the exemplary embodiments, the control module 100 further controls the driving module 107 to move the curing platform 104 for making the bottom of the curing platform 104 contact the liquid level of the print materials 20 in the material tank 105.

Step S21: the control module 100 selects one of the multiple layers of print data in order, such as the first layer of print data. One of the exemplary embodiments, each layer of print data comprises a layer number. The control module 100 may determine a print order of each layer of print data according to above layer number. For example, the control module 100 configures the stereolithography 3D printer 1 to print from the lowest layer number to the highest number.

Step S22: the control module 100 controls the light module 103 to irradiate the material tank 105 according to the selected layer of print data for making the print materials 20 contacting with the curing platform 104 (or the printed slice physical model) curing into one layer of slice physical mode.

One of the exemplary embodiments, each layer of print data comprises a 2D image, the light module 103 comprises a plurality of light spots. The control module 100 adjust luminous flux of each corresponding light spot of the light module 103 according to a pixel value of each pixel of the selected 2D image, and controls each light spot to irradiate according to each position corresponding to each pixel in the curing platform 104 for manufacturing one layer of slice physical model.

Step S23: the control module 100 raises the curing platform 104 for a default layer height (such as one millimeter) via the driving module 107.

Step S24: the control module 100 determines whether there is the next layer of slice physical model having to be printed. Namely, the control module 100 determines whether the completion of printing. More specifically, the control module 100 determines whether the printing had been completed according to the layer number of the currently selected layer of print data. Namely, the control module 100 determines whether the currently selected layer of print data is the last layer of print data.

If the currently selected layer of print data is the last layer of print data, the control module 100 determines completion of printing, and terminates the procedure of 3D printing. Otherwise, the control module 100 performs the step S25.

Step S25: the control module 100 controls the material-providing module 106 to inject the new print materials 20 into the material tank 105 for making the material tank 105 storing the amount of the print materials 20 being enough to print one layer of the slice physical model (such as the depth of the print materials 20 in the material tank 105 is the default layer height), and make the newest layer of slice physical model (the layer of slice physical model manufactured in the step S22) carried on the curing platform 104 contacts with the liquid level of the print materials 20 in the material tank 105.

One of the exemplary embodiments, during injecting the print materials 20, the control module 100 control the driving module 107 to rotate the material tank 105 for mixing the print materials 20 in the material tank 105 and the injected print materials 20 evenly.

One of the exemplary embodiments, the control module 100 may execute the procedure of controlling temperature (such as the steps S11-S13 shown in FIG. 4) for ensuring that the temperature of the print materials 20 in the material tank 105 reaches the ideal working temperature after or in the same time of each time the material-providing module 106 injects the new print materials 20 into the material tank 105.

Then, the control module 100 executes the steps S21 to S24 again for selecting the next layer of print data (such as the second layer of print data), controlling the light module 103 to irradiate the curing platform 104 according to the next layer of print data for curing the print materials 20 contacting with the first layer of slice physical model into the second layer of slice physical model, controlling the driving module 107 to raise the curing platform 104 for the default layer height again, and determining whether completion of printing.

Please be noted that there is not an order relationship between the step S23 and the step S25. One of the exemplary embodiments, the step S23 and the step S25 may be performed simultaneously (such as being performed after the term "yes" of the step S24 is performed), or the step S25 is first performed and then the step S23 is performed, but this specific example is not intended to limit the scope of the present disclosed example.

Figure 6:
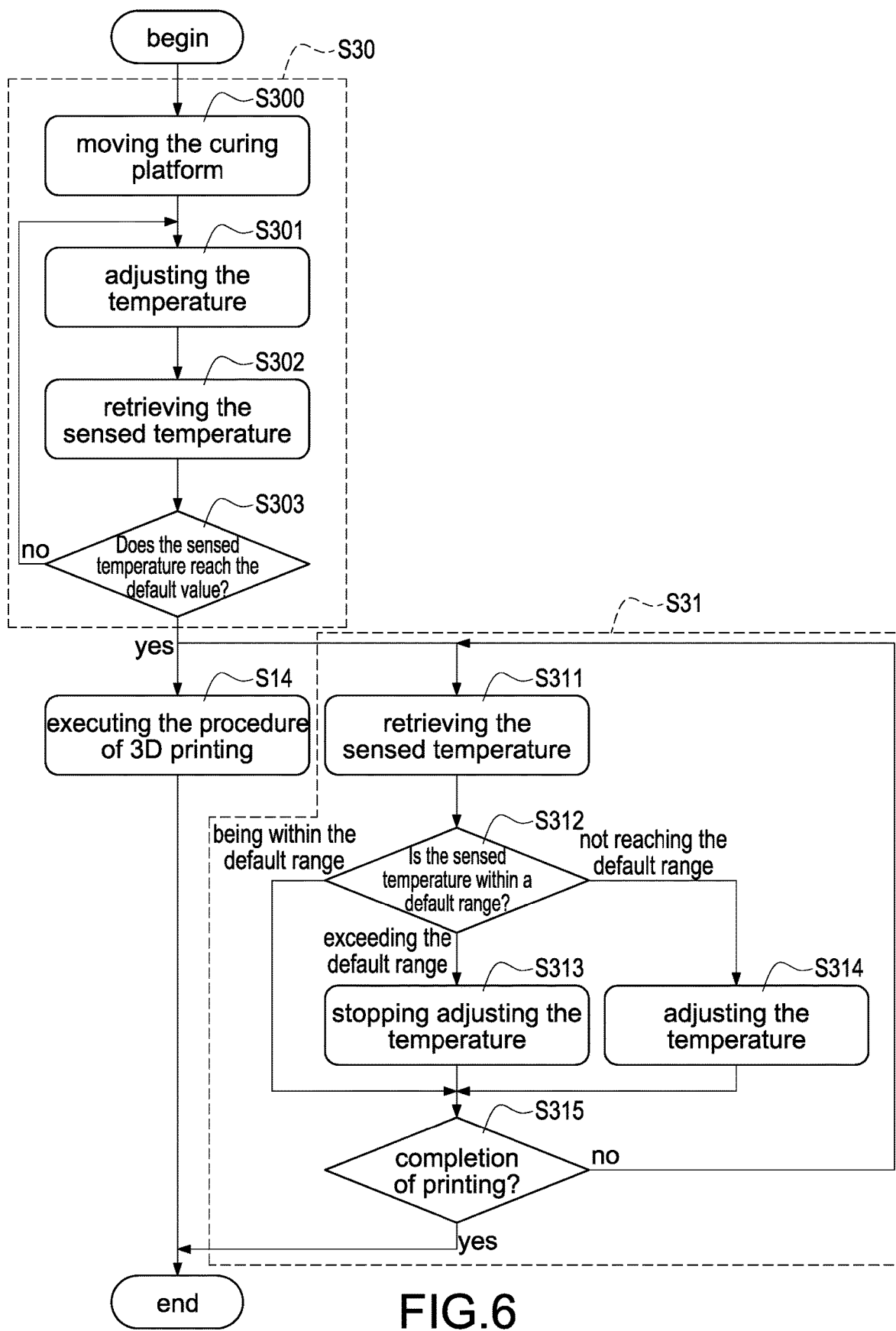
FIG. 6 is a flowchart of a method of adjusting temperature of printing materials according to the third embodiment of the present disclosed example.

Please refer to FIG. 3 and FIG. 6 simultaneously, FIG. 6 is a flowchart of a method of adjusting temperature of printing materials according to the third embodiment of the present disclosed example. Compare to the method of adjusting temperature of printing materials of the embodiment shown in FIG. 4, the procedure of controlling temperature (the step S13) of this embodiment comprises a procedure of initial controlling temperature S30 and a procedure of real-time controlling temperature S31. The procedure of initial 3D printing S30 is configured to adjust the temperature for making the temperature of the print materials 20 reach the ideal working temperature (namely, the default value) before execution of the procedure of 3D printing. The procedure of real-time controlling temperature is configured to immediately monitor the temperature of the print materials 20 and immediately adjust the temperature for making the print materials 20 keep within the ideal temperature range (namely, the default range) during execution of the procedure of 3D printing.

More specifically, the procedure of initial controlling temperature of this embodiment comprises following steps.

Step S300: the control module 100 moves the curing platform 104 to a waiting position (such as a position which a distance from the liquid level of the print material to the position is 20 Centimeters) via the driving module 107. The present disclosed example can form a larger air convection space above the material tank 105 via moving the curing platform 104 to the waiting position, and improve the efficiency of adjusting the temperature.

Step S301: the control module 100 controls the temperature-adjusting module 101 to start to heat/cool.

Although the step S300 is performed before the step S301 in above description, but this specific example is not intended to limit the scope of the present disclosed example. One of the exemplary embodiments, the step S300 and the step S301 are performed simultaneously.

Step S302: the control module 100 controls the temperature-sensing module 102 to sense the current sensed temperature.

Step S303: the control module 100 determines whether the sensed temperature reaches the default value. If the sensed temperature reaches the default value, the control module 100 terminates the procedure of initial controlling temperature S30 and start to execute the procedure of 3D printing (step S14). Otherwise, the control module 100 executes the step S301 to the step S303 again.

Please be noted that the control module 100 may continue to control the temperature-adjusting module 101 to start/continue to heat/cool, or control the temperature-adjusting module 101 to stop heating/cooling after the procedure of controlling temperature S30 ends, but this specific example is not intended to limit the scope of the present disclosed example.

Please be noted that when/before the procedure of initial controlling temperature S30 starts to be performed, the control module may directly perform the procedure of 3D printing (step S14) if determining that the currently sensed temperature sensed by the temperature-sensing module 102 has reached the default value, such as the environmental temperature is consistent with the default value which may be treated as the temperature of the print materials 20 also being consistent with the default value.

Then, during execution of the procedure of 3D printing (step S14), the control module 100 executes the procedure of real-time controlling temperature simultaneously S31. The control module 100 may execute the procedure of real-time controlling temperature regularly (such as executing per 10 minutes) or conditionally (such as executing after one layer of slice physical model has been printed each time). In this embodiment, the memory module 108 further store a default range. One of the exemplary embodiments, above default range covers above default value. The procedure of real-time controlling temperature procedure of controlling temperature S31 comprises following steps.

Step S311: the control module 100 retrieves the currently sensed temperature via the temperature-sensing module 102.

Step S312: the control module 100 whether the sensed temperature is within the default range.

Take it for example that the temperature-adjusting module 101 is a heater and the default range is 25 degrees Celsius (lower limit value) to 28 degrees (upper limit value). If the sensed temperature (such as 26 degrees Celsius) is within the default range, the control module 100 may determine that the sensed temperature is within the default range. If the sensed temperature (such as 24 degrees Celsius) is lower than the lower limit value, the control module 100 may determine that the sensed temperature doesn't reach the default range (such as insufficiently heating). If the sensed temperature (such as 29 degrees Celsius) is greater than the upper limit value, the control module 100 may determine that the sensed temperature exceeds the default range (such as over-heating).

Take it for example that the temperature-adjusting module 101 is a cooler and the default range is 25 degrees Celsius (lower limit value) to 28 degrees (upper limit value). If the sensed temperature (such as 26 degrees Celsius) is within the default range, the control module 100 may determine that the sensed temperature is within the default range. If the sensed temperature (such as 24 degrees Celsius) is lower than the lower limit value, the control module 100 may determine that the sensed temperature exceeds the default range (such as over-cooling). If the sensed temperature (such as 29 degrees Celsius) is greater than the upper limit value, the control module 100 may determine that the sensed temperature doesn't reach the default range (such as insufficiently cooling).

The control module 100 performs the step S315 when the sensed temperature is within the default range, performs the step S313 when the sensed temperature exceeds the default range, and performs the step S314 when the sensed temperature doesn't reach the default range.

Step S313: the control module 100 controls the temperature-adjusting module 101 to stop heating/cooling for making the temperature of the print materials 20 tend to the default range when over-heating/over-cooling.

One of the exemplary embodiments, the control module 100 may control the stereolithography 3D printer 1 to stop heating/cooling temporarily and print continuously when over-heating/over-cooling. More specifically, after stopping heating/cooling, the temperature of the overheated/overcooled print materials 20 will tend to the default range (ideal working temperatures), this makes the print quality of the printing 3D physical model get better and better. Above scheme will not significantly reduce the print quality of the 3D physical model because only a few layers of slice physical model may be over-curing or incomplete curing.

Thus, the present disclosed example can effectively save the time to wait for cooling/heating, and reduce the time required for printing.

One of the exemplary embodiments, the control module 100 may control the stereolithography 3D printer 1 to stop printing when over-heating/over-cooking. Thus, the present disclosed example can effectively prevent the print materials 20 from being incomplete curing and overcuring because the print materials are under the ideal working temperature during 3D printing, and improve the 3D print quality.

Step S314: the control module 100 controls the temperature-adjusting module 101 to start/continue to heat/cool for making the temperature of the print materials 20 tend to the default range when insufficiently heating/cooling.

One of the exemplary embodiments, the control module 100 may control the stereolithography 3D printer 1 to start/continue to heat/cool and stop printing when insufficiently heating or insufficiently cooling. Thus, the present disclosed example can effectively prevent the print materials 20 from being incomplete curing and overcuring because the print materials are under the ideal working temperature during 3D printing, and improve the 3D print quality.

One of the exemplary embodiments, the control module 100 may control the stereolithography 3D printer 1 to stop heating/cooling temporarily and print continuously when insufficiently heating or insufficiently cooling. More specifically, after starting to heat/cool, the temperature of the insufficiently heated/insufficiently cooled print materials 20 will tend to the default range (ideal working temperatures), this makes the print quality of the printing 3D physical model get better and better. Thus, the present disclosed example can effectively save the time to wait for heating/cooling, and reduce the time required for printing.

Please be noted that the overcured print materials 20 (the temperature of the print materials 20 exceeds the default range during irradiation) have less damage on structure or visual effects of the 3D physical model than the incompletely cured print materials 20 (the temperature of the print materials 20 doesn't reach the default range during irradiation). Thus, when the temperature-adjusting module 101 is a heater, one embodiment of the present disclosed example may continue to print when over-heating and stop printing when insufficiently heating, so as to get the best balance between reducing the time required for printing and improve the print quality of 3D printing.

Step S315: the control module 100 determinates whether the procedure of 3D printing finished, such as determining whether the last slice physical model is completed to print.

If the procedure of 3D printing finished, the control module 100 terminates the method of adjusting temperature of printing materials. Otherwise, the control module 100 executes the procedure of real-time controlling temperature S31 for making the temperature of the print materials 20 keep within the default range during printing.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A stereolithography 3D (three-dimensional) printer, comprising:
   a material tank configured to store print materials;
   a light module configured to transmit beams to the material tank;
   a temperature-adjusting module configured for temperature-adjusting, the temperature-adjusting module comprising a forced convection apparatus, an arrangement position of the forced convection apparatus is higher than an arrangement position of the material tank;
   a temperature-sensing module configured to sense a sensed temperature;
   a curing platform configured to carry a 3D physical model;
   a memory module configured to store print data and a default value;
   a driving module connected to the curing platform; and
   a control module electrically connected to the light module, the temperature-adjusting module, the temperature-sensing module, the memory module and the driving module, the control module being configured to execute a procedure of controlling temperature to control the driving module to move the curing platform to a waiting position for making the curing platform be located above the material tank and between the temperature-adjusting module and the material tank and making a distance between the curing platform and the material tank be a default distance, and control the temperature-adjusting module to adjust a temperature of the print materials when the sensed temperature doesn't reach the default value, the control module being configured to execute a procedure of 3D printing according to the print data to control the light module to irradiate the print materials whose temperature had been adjusted for manufacturing the 3D physical model when the sensed temperature reaches the default value;
   wherein the stereolithography 3D printer is a bottom-up light source stereolithography 3D printer.

2. The stereolithography 3D printer according to claim 1, wherein; the temperature-adjusting module is a heater; the control module is configured to control the temperature-adjusting module to heat.

3. The stereolithography 3D printer according to claim 2, wherein the stereolithography 3D printer further comprises a case, the case covers the temperature-adjusting module, the temperature-sensing module, the curing platform, and the material tank; the temperature-adjusting module is an air heater configured to heat air inside the case for forming a closed circulation of the heated air inside the case.

4. The stereolithography 3D printer according to claim 3, wherein the temperature-sensing module is arranged at a position to sense a temperature of air around the material tank as the sensed temperature.

5. The stereolithography 3D printer according to claim 1, wherein the temperature-adjusting module is a heater; the memory module further stores a default range; the control module compares the sensed temperature with the default range during the execution of 3D printing, controls the temperature-adjusting module to stop heating when the sensed temperature exceeds the default range, and controls the temperature-adjusting module to heat when the sensed temperature doesn't reach the default range.

6. The stereolithography 3D printer according to claim 5, wherein the control module controls the stereolithography 3D printer to continue to print when the sensed temperature exceeds the default range, and controls the stereolithography 3D printer to stop printing when the sensed temperature doesn't reach the default range.

7. The stereolithography 3D printer according to claim 1, wherein the stereolithography 3D printer further comprises:

a material-providing module electrically connected to the control module, the material-providing module is configured to inject the print materials into the material tank; and the driving module is further connected to the material tank, the driving module (107) being and further configured to move the material tank;

wherein the control module controls the material-providing module to inject the print materials into the material tank before or in the same time of execution of the procedure of controlling temperature, and controls the driving module to rotate the material tank during injecting for mixing the print materials in the material tank and the injected print materials evenly.

8. A method of adjusting temperature of printing materials applied to a stereolithography 3D (three-dimensional) printer, the stereolithography 3D printer comprising a temperature-adjusting module, a temperature-sensing module, a light module, a curing platform and a material tank and a driving module, the stereolithography 3D printer is a bottom-up light source stereolithography 3D printer, the method of adjusting temperature of printing materials comprising following steps:

a) retrieving a sensed temperature via the temperature-sensing module;

b) executing a procedure of controlling temperature to control the temperature-adjusting module to adjust a temperature of the print materials in the material tank when the sensed temperature doesn't reach a default value; and c) executing a procedure of 3D printing according to print data to control the light module to irradiate the print materials whose temperature had been adjusted for manufacturing a 3D physical model when the sensed temperature reaches the default value;

wherein the procedure of controlling temperature comprises following steps:

d1) controlling the driving module to move the curing platform to a waiting position for making the curing platform be located above the material tank and between the temperature-adjusting module and the material tank and making a distance between the curing platform and the material tank be a default distance; and d2) adjusting the temperature of the print materials in the material tank via a forced convection apparatus of the temperature-adjusting module, wherein an arrangement position of the forced convection apparatus is higher than an arrangement position of the material tank.

9. The method of adjusting temperature of printing materials according to claim 8, wherein, the temperature-adjusting module is a heater; the step d2) is performed to control the temperature-adjusting module to heat.

10. The method of adjusting temperature of printing materials according to claim 9, wherein the stereolithography 3D printer further comprises a case, the temperature-adjusting module is an air heater, the step d2) is configured to control the temperature-adjusting module to heat air inside the case for forming a closed circulation of the heated air inside the case.

11. The method of adjusting temperature of printing materials according to claim 8, further comprising following steps:

f1) retrieving the sensed temperature during execution of the procedure of 3D printing;

f2) controlling the temperature-adjusting module to stop heating when the sensed temperature exceeds a default range; and f3) controlling the temperature-adjusting module to heat when the sensed temperature doesn't reach the default range.

12. The method of adjusting temperature of printing materials according to claim 11, wherein the step f2) is configured to control the temperature-adjusting module to stop heating and control the stereolithography 3D printer to continue to print; the step f3) is configured to control the stereolithography 3D printer to stop printing and control the temperature-adjusting module to heat.

13. The method of adjusting temperature of printing materials according to claim 8, wherein the stereolithography 3D printer further comprises a material-providing module and a driving module, the method of adjusting temperature of printing materials further comprises a step g) controlling the material-providing module to inject the print materials into the material tank and control the driving module to rotate the material tank during injecting for mixing the print materials in the material tank and the injected print materials evenly.

* * * * *